United States Patent
Anand et al.

(10) Patent No.: US 9,912,757 B2
(45) Date of Patent: Mar. 6, 2018

(54) CORRELATION IDENTITY GENERATION METHOD FOR CLOUD ENVIRONMENT

(71) Applicant: P. Ashok Anand, Chennai (IN)

(72) Inventors: P. Ashok Anand, Chennai (IN);
Yerradla Giribabu, Chennai (IN);
Shankar Gowri, Chennai (IN)

(73) Assignee: P. Ashok Anand, Chennai (IN)

( * ) Notice: Subject to any disclaimer, the term of this patent is extended or adjusted under 35 U.S.C. 154(b) by 178 days.

(21) Appl. No.: 14/769,852

(22) PCT Filed: Feb. 25, 2014

(86) PCT No.: PCT/IN2014/000124
§ 371 (c)(1),
(2) Date: Aug. 24, 2015

(87) PCT Pub. No.: WO2014/128732
PCT Pub. Date: Aug. 28, 2014

(65) Prior Publication Data
US 2016/0006821 A1    Jan. 7, 2016

(30) Foreign Application Priority Data
Feb. 25, 2013    (IN) .............................. 817/CHE/2013

(51) Int. Cl.
*G06F 13/00* (2006.01)
*H04L 29/08* (2006.01)
(Continued)

(52) U.S. Cl.
CPC ............ *H04L 67/146* (2013.01); *G06F 21/44* (2013.01); *H04L 63/0876* (2013.01);
(Continued)

(58) Field of Classification Search
CPC ..... H04L 67/146; H04L 67/141; H04L 21/44; H04L 63/0876; H04L 12/4641;
(Continued)

(56) References Cited

U.S. PATENT DOCUMENTS 7,467,389 B2    12/2008    Mukkamala et al.
8,510,446 B1    8/2013    Pai
(Continued)

*Primary Examiner* — Kenneth R Coulter
(74) *Attorney, Agent, or Firm* — Gable Gotwals

(57) ABSTRACT

This invention relates to a method for generating correlation identity with respect to a client to establish, integrate and communicate to a server within a cloud environment (e.g. Inswit™ Cloud). A service location identity can be generated with respect to a remote client by getting at least one service node of an appropriate service request made by the client device within the cluster of the cloud environment. A correlation ID/source ID can be thereafter generated based on the service location identity to serialize the payload and establish a connection with the server. The integration services with respect to the client device can be instantiated to permit authenticated information flow within the cloud network. The messages including the information on the destination end points can be finally emanated out of the source end points to the destination end point by efficiently authenticating the client devices using the correlation ID.

10 Claims, 3 Drawing Sheets

(51) Int. Cl.
*G06F 21/44* (2013.01)
*H04W 4/00* (2018.01)
*H04L 29/06* (2006.01)

(52) U.S. Cl.
CPC ............ *H04L 67/10* (2013.01); *H04L 67/141* (2013.01); *H04W 4/003* (2013.01)

(58) Field of Classification Search
CPC ......... H04L 2012/5621; H04L 67/1002; H04L 67/104; H04L 47/805; H04L 67/10; G06F 21/44; H04W 4/003
USPC ................ 709/249, 238, 245, 220–222, 203, 709/227–229
See application file for complete search history.

(56) References Cited

U.S. PATENT DOCUMENTS

| | | | |
|---|---|---|---|
| 8,874,914 B2* | 10/2014 | Stauth | H04L 63/08 713/170 |
| 9,276,926 B2* | 3/2016 | Stauth | H04L 63/08 |
| 2008/0052771 A1 | 2/2008 | Delmond et al. | |
| 2009/0288084 A1* | 11/2009 | Astete | G06F 9/45533 718/1 |
| 2011/0032906 A1 | 2/2011 | Mutikainen et al. | |
| 2011/0197065 A1* | 8/2011 | Stauth | H04L 63/08 713/170 |
| 2014/0380441 A1* | 12/2014 | Stauth | H04L 63/08 726/6 |
| 2016/0014211 A1* | 1/2016 | Gowri | H04W 4/003 709/227 |

* cited by examiner

| B1 | B2 | B3 | B4 | B5 | B6 | B7 | B8 |
|----|----|----|----|----|----|----|----|
| Data Identification ID | | | | Number of Packets | | | |

| B9 | B10 | B11 | B12 | B13 | B14 | B15 | B16 |
|----|-----|-----|-----|-----|-----|-----|-----|
| Packet Size | | | | Last Packet Size | | | |

| B17 | B18 | B19 | B20 | B21 | B22 | B23 | B24 |
|-----|-----|-----|-----|-----|-----|-----|-----|
| Correlation ID | | | | | | | |

| Data Packet 1 of Packet Size | ... | Data Packet n-1 of Packet Size | Data Packet n of Last Packet Size |

FIG.2

CORRELATION IDENTITY GENERATION METHOD FOR CLOUD ENVIRONMENT

CROSS-REFERENCE TO RELATED APPLICATIONS

This application is the United States National Phase of Patent Application No. PCT/IN2014/000124 filed 25 Feb. 2014, which claims priority to Indian Patent Application No. 817/CHE/2013 filed 25 Feb. 2013, each of which is incorporated herein by reference.

TECHNICAL FIELD

Embodiments are generally related to data processing systems and methods. Embodiments are also related to cloud computing platforms and networks. Embodiments are additionally related to methods for generating identity (IDs) with respect to the remote clients within a cloud environment.

BACKGROUND OF THE INVENTION

Cloud computing platforms typically host a wide variety of applications in a virtual environment. In general, the concepts of "virtual" and "cloud computing" include the utilisation of a set of shared computing resources (e.g., servers) which are typically consolidated in one or more data center locations. In a cloud environment, computer resources may be available in different sizes and configurations so that different resource types can be specified to meet specific needs of different clients/users. Cloud computing offers outsourced flexibility without having to manage the purchase and operation of additional hardware resources within an organization.

The cloud computing platform permits an organisation/individual to use datacenters designed and maintained by third parties. Such virtual environments cater a wide range of small or large organizations with requested hardware resources, software resources, network resources, and storage resources. The virtual environment also provides application security, application reliability, application scalability, and availability. Typically cloud computing platforms include a load balancer and a collection of servers (e.g., a lean server/nano server) that process messages from the client devices that communicate with the cloud computing platform. The servers are configured to process the messages received from the client devices.

Majority of cloud computing platforms involve the exchange of various communications between organisation/individual client systems and the server in order to process the messages received from the client devices. The communication between the client device and the server will be in the form of requests from client systems and responses from servers. In such typical client-server architectures, the processes that handle client-server communications may perform certain common functions apart from exchanging requests and responses. For example, before a client system can send a request to a server, a connection must be established, the client may be required to authenticate with the server.

Most of the prior art methods adapt Internet Protocol (IP) address of the client devices in order to authenticate and establish a connection between the client device and the server using the load balancer. Such prior art systems are unable to efficiently execute the intended purpose in a complex datacenter environment. In situations, authenticating the client device and connecting the client device to an appropriate server within the cloud environment becomes cumbersome and time consuming process.

Based on the foregoing, it is believed that a need exists for an improved method for generating a correlation identity (ID) with respect to a client device accessing the server in a cloud environment. A need also exists for an improved method for switching, integrating and executing client communications to an appropriate server in the cloud environment using the correlation ID.

SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method for generating correlation ID with respect to the client devices within the cloud environment.

It is another aspect of the disclosed embodiments to provide for an improved method for authenticating and integrating client devices with appropriate server using the correlation ID.

It is further aspect of the disclosed embodiments to provide for an improved method for switching messages between client devices and server within a cloud environment.

The aforementioned aspects and other objectives and advantages can now be achieved as described herein. A method for generating correlation identity (ID) with respect to a client in order to thereby establish, integrate and communicate to a server (lean server or nano server) within a cloud environment (e.g., Inswit™ Cloud), is disclosed herein. A service location identity (ID) can be generated with respect to a remote client (e.g., a source end point) by getting at least one service node of an appropriate service request made by the client device within the cluster of the cloud environment. A correlation ID/source ID (e.g., an Inswit™ ID) can be thereafter generated based on the service location identity in order to serialize the payload and establish a connection with the server (e.g., a destination end point). The integration services with respect to the client device can be instantiated in order to thereby permit authenticated information flow (in/out flow) within the cloud network. The messages including the information on the destination end points can be finally emanated out of the source end points to the destination end point by efficiently authenticating the client devices using the correlation ID.

The method of authenticating and switching the client devices to appropriate destination end points based on the correlation ID can be a new paradigm in information exchange/software integration catering the requirements of a wide range of enterprise computing environments. A client in the cloud environment can typically register and acquire the unique ID "correlation ID" that is analogous to "IP address" in order to thereby identify the destination end point within the cloud environment. The client can be typically permitted to request a service within the cloud environment. The service location with respect to the service request of the client can be checked for availability in order to thereby establish a connection between the end points.

If the requested service ID is not available, the service nodes with respect to the requested service can be revoked in order to determine the availability of the service within the cluster. On determining the service within the cluster, the load balancer can be employed to load balance the cluster and get the service node in order to execute the requested service of the client. If the service is not available in the cluster, the requested service can be either located in the data centre, service domain or other domains in order to generate an appropriate source ID for the requested service.

The correlation ID with respect to the client can be generated in order to thereby serialize the payload by establishing the end point connection. Once the end point is established, the integration services can be instantiated on the end points in order to start information flow (in and out flow) with respect to the integration services. If the service location of the client is found within the service node of the server, the message can be sent to the domain gateway in order to publish the message to the server queue and receive response with respect to the message on the server queue.

Otherwise, the message can be prepared as per the socket protocol in order to send to a gateway. The message can be sent to the domain gateway in order thereby receive response with respect to the message on the server queue. The message can be similarly sent to the datacenter gateway in order thereby receive response with respect to the message on the server queue. Alternatively, the message can be processed by a cluster in order to thereby send the message to a bridge for receiving the response with respect to the message on the server queue.

The method proposed herein in one embodiment of the invention can be primarily responsible for switching messages emanating out of the end points to the destination end point. The switching application proposed herein apart from switching messages can be also responsible for invoking an interceptor in order to a call to a server where the messages can be transformed before being sent to the target end point.

The method proposed herein in another embodiment can be a pervasive architecture that is capable of switching messages to and fro from any physical end point on the globe. The process of establishing the connectivity between the end points utilize at least one social principle, including end points can be clubbed into groups in order to share information as broadcasts, end points can be capable of communicating point to point in order facilitate request permission to communicate with the other endpoints as well as invite others to communicate with the end points.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a graphical representation of the correlation ID of a remote client in the cloud network, in accordance with the disclosed embodiments.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
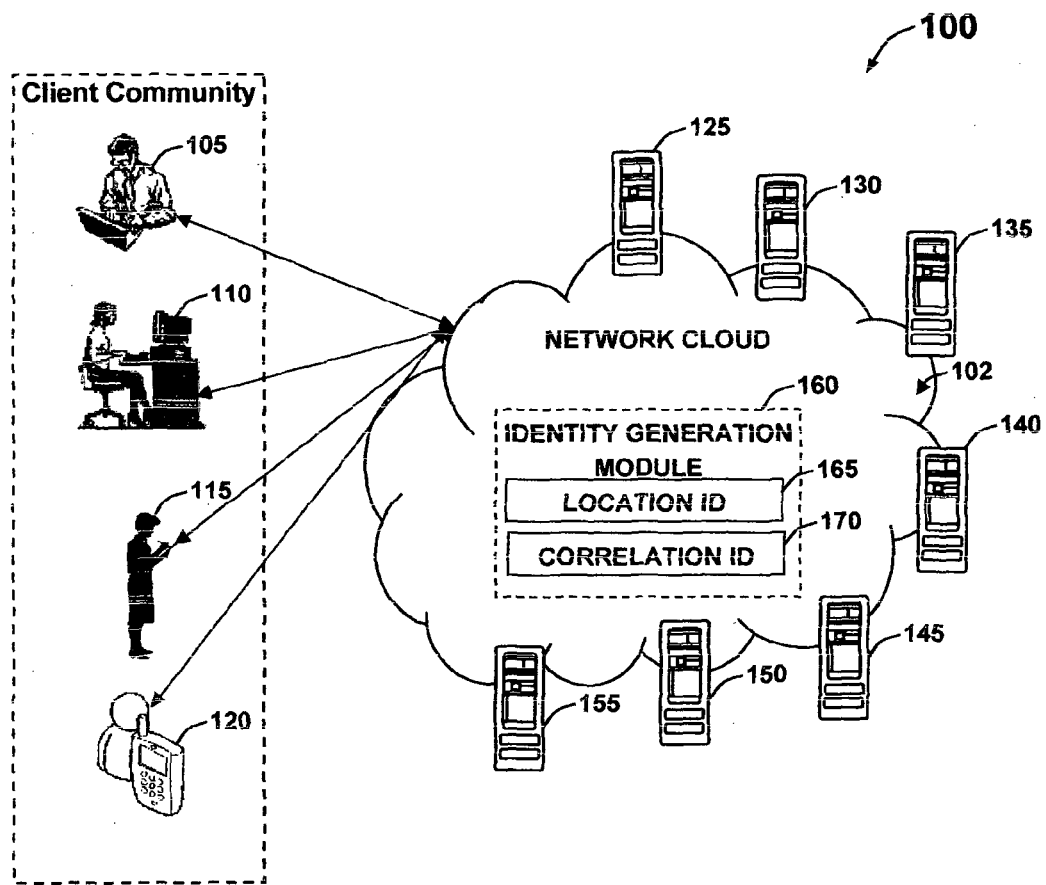
FIG. 1 illustrates a graphical representation of a cloud computing network for generating correlation ID with respect to a remote client, in accordance with the disclosed embodiments.

FIG. 1 illustrates a graphical representation of a cloud computing network 100 for generating a correlation ID 170 with respect to a remote client such as for example, remote clients 105, 110, 115 and 120, in accordance with the disclosed embodiments. A person skilled in the art will appreciate, the cloud computing network 100 is any situation in which computing is done in a remote location ("out in the clouds"), rather than on a broadband customer's desktop or portable device. Cloud computing network 100 includes not only "remote" computing, but also "unspecified resources," that is, any computing task commended to the cloud can be performed by any set of machines, and the identity of the machines in the set is not important to the machine that receives the results of the task.

The cloud computing network 100 includes at least one nano server or lean server such as the server 125, 130, 135, 140, 145, 150 and 155 that is operatively connected to a dynamic cloud network 102. The cloud network 102 is typically configured to perform direct addressability and direct server return. The cloud computing network 100 adapts a typical kind of mechanism that optimizes load balanced access to servers 125-155 in the cloud computing network 100. A load balancer connected to the servers 125-155 receives a message from the remote client 105-120. In turn, the load balancer selects a server 125-155 to process the message. The message is transmitted to the server 125-155, which processes the message and responds with a reply message. The reply message from the server 125-155 bypasses the load balancer and is routed to the client device 105-120 using the unique correlation ID 170 of the remote client 105-120.

Note that the cloud computing network 100 described herein may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and non-removable media, and media readable by a database, a switch, and various other network devices.

In the depicted example, server 125-155 provides data, such as boot files, operating system images, and applications to clients 105-120. Clients 105-120 are clients to server in this example, Cloud computing network 100 may include additional servers, clients, and other devices not shown. Specifically, clients 105-120 may connect to any member of a network of servers 125-155 which provide equivalent content.

In the depicted example, cloud computing network 100 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network 100 also may be implemented as a number of different types of networks, such as for example, an intranet, a local area network (LAN), or a wide area network (WAN).

Figure 3:
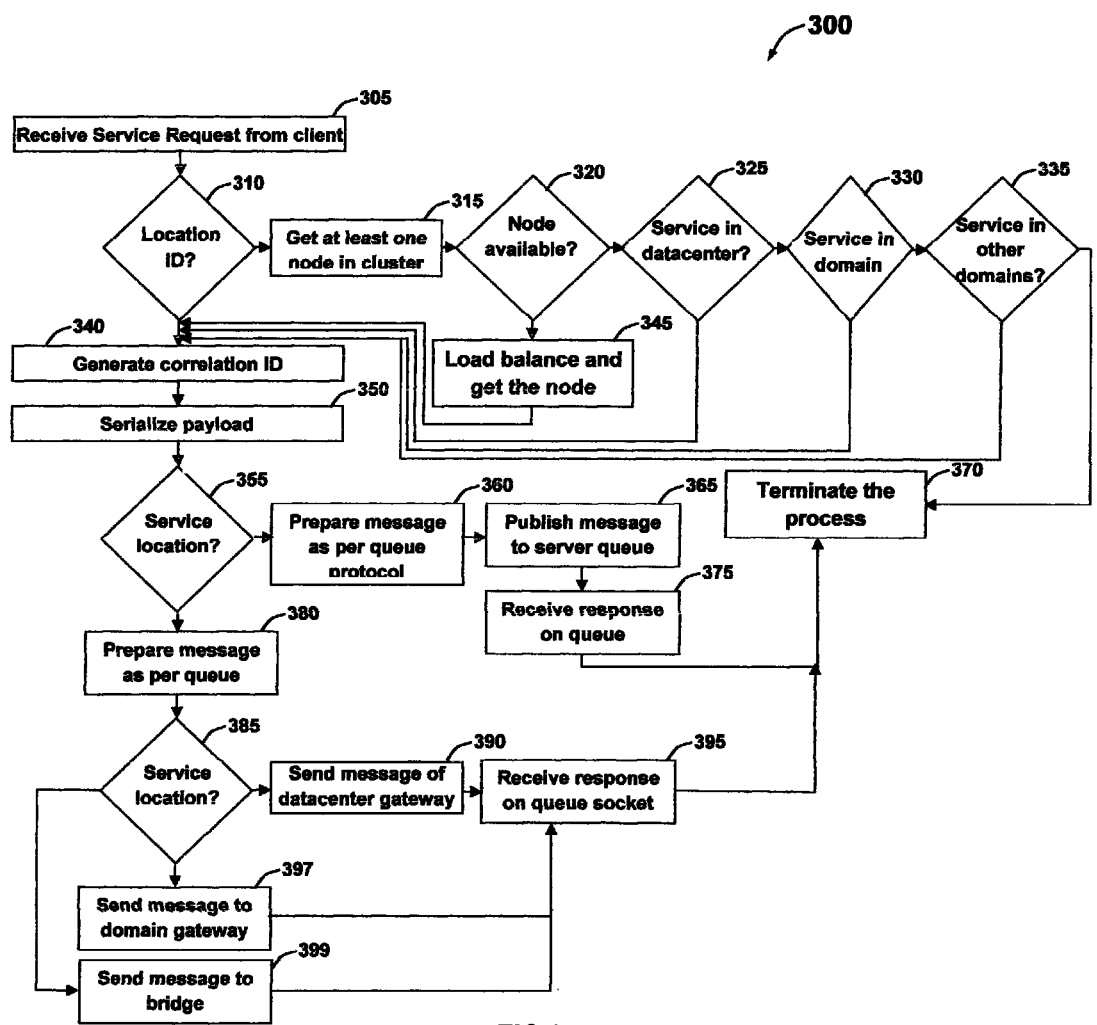
FIG. 3 illustrates a high level flow chart of operation illustrating logical operating steps of a method for generating and establishing connection between a remote client and a cloud based server using the correlation ID, in accordance with the disclosed embodiments.

FIGS. 1-3 are thus intended as an example, and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, Windows, UNIX, LINUX, and the like.

The cloud computing network 100 includes a identity generation module 160 for generating correlation identity (ID) 170 with respect to a client 105-120 in order to thereby establish, integrate and communicate to at least one server 125-155 within the cloud environment (e.g., Inswit™ Cloud) 102. The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The identity generation module 160 identifies or generates a service location identity (ID) 165 respect to the remote client 105-120 by getting at least one service node of an appropriate service request made by the client device 105-120 within the cluster of the cloud environment 102. The identity generation module 160 also generates the correlation ID/source ID (e.g., an Inswit™ ID) 170 based on the service location identity 165 in order to serialize the payload and establish a connection with the server 125-155.

The integration services with respect to the client device 105-120 can be instantiated in order to thereby permit authenticated information flow (in/out flow) within the cloud network 100. The messages including the information on the destination end points can be emanated out of the source end points to the destination end point by efficiently authenticating the client devices 105-120 using the correlation ID 170. The cloud network 100 described herein effectively authenticates and switches the client devices 105-120 to appropriate destination end points 125-155 based on the correlation ID 170 by bringing a new paradigm in information exchange/software integration for catering the requirements of a wide range of enterprise computing environments.

FIG. 2 illustrates a graphical representation of the correlation ID 170 of the remote client 105-120 in the cloud network 100, in accordance with the disclosed embodiments. The remote client 105-120 in the cloud environment 100 can typically register and acquire the unique ID "correlation ID" that is analogous to "IP address" in order to thereby identify the destination end point within the cloud environment 100. The client 105-120 can be typically permitted to request a service using the correlation ID 170 within the cloud environment 100. The service location with respect to the service request of the client can be checked for availability in order to thereby establish a connection between the end points.

The correlation ID 170 is a 64 bit identification ID used to emanate the messages including the information on the destination end points by efficiently authenticating the client devices 105-120. The correlation ID 170 includes a data identification ID (Bytes B1-B4) representing the ID of the data packets queued in the system message queue. The data identification ID is combination of lean server ID and unique atomic integer. Bytes B5-B8 represents the total number of data segments attached with the header queued in the message queue. Bytes B9 and B12 represents size of the packets from 1 to n−1 where 'n' is the total number of packets. Bytes B12-B16 represents size of the nth packet where 'n' is the total number of packets. Bytes B17-B24 represents the unique correlation ID including details of the domain ID, data centre, cluster, node, lean server and unique ID. Below table illustrates the contents of the correlation ID 170.

| b1 | b2 | b3 | b4 | b5 | b6 | | | | Bits 1 to 6 represent ID of a Domain. Maximum possible number of domains in the system = $2^6$ = 64. |
|----|----|----|----|----|----|---|---|---|---|
| b7 | b8 | b9 | b10 | b11 | b12 | | | | Bits 7 to 12 represent ID of a Data Center in a domain. Maximum possible number of data centers in a domain = $2^6$ = 64. |
| b13 | b14 | b15 | b16 | b17 | b18 | | | | Bits 13 to 18 represent ID of a Cluster in a data center. Maximum possible number of clusters in a data center = $2^6$ = 64. |
| b19 | b20 | b21 | b22 | b23 | b24 | | | | Bits 19 to 24 represent ID of a Node in a cluster. Maximum possible number of nodes in a cluster = $2^6$ = 64. |
| b25 | b26 | . | . | . | . | b30 | b35 | b36 | Bits 25 to 36 represent ID of a Lean Server in a node. Maximum possible number of lean servers in a node = $2^{12}$ = 4096. |
| b37 | b38 | . | . | . | . | . | b63 | b64 | Bits 37 to 64 represent a unique ID of the message. This is guaranteed to be unique in a session. The maximum number of IDs that can be generated = $2^{30}$ = 1073741824 |

FIG. 3 illustrates a high level flow chart of operation illustrating logical operating steps of a method 300 for generating and establishing connection between a remote client 105-120 and a cloud based server 125-155 using the correlation ID 170, in accordance with the disclosed embodiments. The method 300 of authenticating and switching the client devices to appropriate destination end points based on the correlation ID can be a new paradigm in information exchange/software integration catering the requirements of a wide range of enterprise computing environments. Thus, the method 300 described herein can be deployed as process software in the context of a computer system or data-processing system as that depicted in FIGS. 1-3.

The client 105-120 can be typically permitted to request a service within the cloud environment 100, as illustrated at block 305. The service location with respect to the service request of the client 105-120 can be checked for availability in order to thereby establish a connection between the end points, as depicted at block 310.

If the requested service ID 165 is not available, the service nodes with respect to the requested service can be revoked in order to determine the availability of the service within the cluster, as illustrated at block 315. On determining the service within the cluster as shown at block 320, the load balancer can be employed to load balance the cluster and get the service node in order to execute the requested service of the client 105-120, as illustrated at block 345. The load balancer ensures that the servers distribute processing of messages among the servers 125-155. The load balancer is configured to receive a message and to select a server 125-155 from the group of servers 125-155 to process the message. In turn, the load balancer changes the destination media access control address of the message to the media access control address of the server 125-155. The load balancer transmits the modified message to the selected server 125-155 using the correlation ID 170. The selected server 125-155 sends a reply to the remote client device 105-120. If the service is not available in the cluster, the requested service can be either located in the data centre, service domain or other domains in order to generate an appropriate source ID 170, as illustrated at blocks 325, 330, 335 consecutively.

The correlation ID 170 with respect to the client 105-120 can be generated in order to thereby serialize the payload by establishing the end point connection, as illustrated at blocks 340 and 350. Once the end point is established, the integration services can be instantiated on the end points in order to start information flow (in and out flow) with respect to the integration services. If the service location of the client is found within the service node of the server 125-155, as illustrated at, block 355, the message with respect to the remote client 105-120 can be prepared as per the queue protocol, as illustrated at block 360. The message can be further published to server queue in order to receive response on the queue, as illustrated at blocks 365 and 375.

If the service location is not found within the lean server 125-155, the message can be prepared as per socket protocol, as depicted at block 385. The service can be located within the datacenter, domain or bridge, as illustrated at block 385. The message can be sent to the domain gateway in order to publish the message to the server queue and receive response with respect to the message on the server queue, as illustrated at blocks 390 and 395.

Otherwise, the message can be sent to the domain gateway in order thereby receive response with respect to the message on the server queue, as illustrated at block 397. The message can be similarly sent to the datacenter gateway in order thereby receive response with respect to the message on the server queue, as depicted at block 399. The method 300 proposed herein in one embodiment of the invention can be primarily responsible for switching messages emanating out of the end points to the destination end point. The switching application proposed herein apart from switching messages can be also responsible for invoking an interceptor in order to a call to a server where the messages can be transformed before being sent to the target end point.

The method 300 proposed herein in another embodiment can be a pervasive architecture that is capable of switching messages to and fro from any physical end point on the globe. The process of establishing the connectivity between the end points utilize at least one social principle, including end points can be clubbed into groups in order to share information as broadcasts, end points can be capable of communicating point to point in order facilitate request permission to communicate with the other endpoints as well as invite others to communicate with the end points.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:

1. A method for generating correlation identity (ID) with respect to a remote client to establish, integrate and communicate to a lean/nano server within a cloud environment, the cloud environment including a microprocessor having a set of computer executable instructions stored on non-transitory computer readable medium, the microprocessor:
generating a service location identity with respect to a remote client by getting at least one service node of an appropriate service request made by a client device within a cluster of said cloud environment;
generating a correlation ID based on said service location identity to serialize payload and establish a connection with the lean/nano server; and
instantiating at least one integration service with respect to said client device to permit authenticated information flow with respect to said client to establish, integrate and communicate to said lean/nano server within the cloud network.

2. The method of claim 1 further authenticating the remote client at the lean/nano server using correlation ID thereby emanating plurality of messages between said remote client and said lean/nano server.

3. The method of claim 1 further comprising the step of registering said remote client in the cloud environment by acquiring said correlation ID that is analogous to a "IP address" to identify said lean/nano server within the cloud environment.

4. The method of claim 1 further comprising the step of establishing a connection between the remote client and the lean/nano server based on the service request and thereby permitting the remote client to request for a service from the lean/nano server.

5. The method of claim 1 further comprising establishing connection between the remote client and the lean/nano server based on the correlation ID to serialize a payload in accordance with a capacity of the lean/nano server and publish a message to a server queue and receive a response with respect to the message on a server queue.

6. The method of claim 1 further comprising sending a message with respect to the remote client to a data center gateway to receive a response with respect to a message on a server queue when the service location of the remote client is not found on a service node.

7. The method of claim 1 further comprising sending a message with respect to the remote client to a cluster to send the message to a bridge or receiving a response with respect to the message on a server queue when the service location of the remote client is not found on the service node.

8. The method claim 1 further comprising the step of switching messages between the remote client and the lean/nano server using the correlation ID wherein the correlation ID can be used for invoking an interceptor to a call-to-a-server where the messages can be transformed as per a socket protocol before sending to the lean/nano server.

9. The method of claim 1 further comprising switching messages to and from the lean/nano server and the remote client across a globe utilizing at least one social principle to facilitate request permission to communicate between the lean nano server and the remote client.

10. A method for generating correlation identity (ID) with respect to remote client to establish, integrate and communicate to a lean/nano server within a cloud environment, the lean/nano server including a microprocessor having a set of computer executable instructions stored on non-transitory computer readable medium, the microprocessor:
generating a service location identity with respect to a remote client by getting at least one service node of an appropriate service request made by a client device within a cluster of said cloud environment;
generating a correlation ID based on said service location identity to serialize payload and establish a connection with the lean/nano server; and
instantiating at least one integration service with respect to said client device to permit authenticated information flow with respect to said client to establish, integrate and communicate to said lean/nano server within the cloud network; and
registering the remote client in the cloud environment by acquiring said correlation ID that is analogous to "IP address" to identify said lean/nano server within the cloud environment.

* * * * *